United States Patent [19]

Hoornstra

[11] 4,103,978

[45] Aug. 1, 1978

[54] LIQUID PASSAGE THROUGH A MACHINE-PART

[75] Inventor: Simon Hoornstra, Sautpoort, Netherlands

[73] Assignee: Hoogovens Ijmuiden, B.V., IJmuiden, Netherlands

[21] Appl. No.: 668,264

[22] Filed: Mar. 18, 1976

[30] Foreign Application Priority Data

Mar. 13, 1975 [NL] Netherlands ............... 7503175

[51] Int. Cl.² ............................. F16C 17/00
[52] U.S. Cl. ............................ 308/9; 184/5;
  308/5 R; 308/DIG. 1
[58] Field of Search ........... 308/5 R, 36.1, 122,
  308/9; 184/5, 100

[56] References Cited

U.S. PATENT DOCUMENTS

| | | | |
|---|---|---|---|
| 3,604,764 | 9/1971 | Daane | 308/5 R |
| 3,718,209 | 2/1973 | Moslo | 308/5 R |
| 3,902,769 | 9/1975 | Neumann et al. | 308/DIG. 1 |
| 3,952,666 | 4/1976 | Gladish | 308/5 R |

Primary Examiner—Richard A. Bertsch
Attorney, Agent, or Firm—Stevens, Davis, Miller & Mosher

[57] ABSTRACT

A machine part, in which a limited swingable motion can be carried out along a slide surface between a first element and a second element, means being provided for conducting a liquid from a point of the first element which is distant from the slide surface to a side of the second element which faces away from the slide surface, said means having channels or bore holes through both elements with a connecting passage on the slide surface between them, the bore hole in at least one of the two elements being widened at the connecting passage to form an elongated chamber in which there is arranged a flow-through body provided in axial direction with bore holes and axially under pressure, semi-spherical head ends of said flow-through body resting in sealing manner against two ends of the chamber.

9 Claims, 3 Drawing Figures

LIQUID PASSAGE THROUGH A MACHINE-PART

The present invention relates to a machine part and particularly a universal joint in which a limited swinging motion along a slide surface can be carried out between the first and the second elements, means being provided for the conveying of a liquid, for instance a lubricant, from the slide surface of a first element to the slide surface, facing away therefrom, of a second element.

In the case of various elements of machine parts which move on each other, for instance a power transmission by universal joint, the problem can arise that a liquid, for instance a lubricant, is to be brought to different sides of the moving machine parts. The object of the present invention is to solve the problems inherent therein in a manner which is of very simple construction and very reliable in operation.

In accordance therewith, the invention resides in the fact that the devices have channels or bore holes through both elements with a connecting passage on the slide surface between them, the bore hole being widened in at least one of the two elements at the connecting passage to form an elongated chamber in which there is arranged a flow body which is provided axially with bore holes and is axially under pressure, said flow body resting, by means of its semi-spherical head ends in sealing fashion against the two ends of the chamber.

When the invention is applied to the joints of a Cardan shaft the structural problem is thus solved of bringing grease, fed along a shaft, into between the slide surface of two elements moving with respect to each other, and through a plane of movement present between two elements. The problems of such lubrications were so great in known constructions that the use of a grease pump during periodic standstills was always preferred, as a result of which of course continuous lubrication could not be attained, in contradistinction to the present invention. In addition, such a manual lubrication required additional monitoring and additional labor.

On the other hand, in other known lubricating methods in which there was a direct connection of the lubricating channels through several elements which move with respect to each other, there was the great disadvantage that the slide surfaces to be lubricated are mutually connected with each other so that the lubricating liquid seeks a preferred path for instance over only one of the slide surfaces while the other slide surface remains insufficiently lubricated.

Since the principle of the invention is to be applicable also in general to the transporting of liquids, for instance of process liquids, which should not to contact each other over the aforementioned slide surfaces, it is of decisive importance that the transport of the liquid be effected in closed manner, for instance through a plane of movement.

In this connection the simplest solution resides in providing a chamber in only one of the two elements which move with respect to each other. However, if only a small amount of space is available for the arrangement of a flow-through body it may also be advantageous to widen the bore holes in the two elements which move with respect to each other close to the slide surface so as to form chambers and accordingly arrange one of the aforementioned flow through bodies in a chamber divided in this manner; in this connection the semi-spherical head ends of a flow-through body will rest on the shoulders within the bore holes, the bore holes in each case opening into the widened chamber.

As a result of the swinging motion of the elements which move with respect to each other, the flow-through body itself moves in a rocking movement, the semi-spherical head ends however remaining applied in sealing fashion against their corresponding seat. In this way, the bore holes in the two elements are connected directly with each other via the bore in the flow-through body without any loss of liquid occurring at the sealed seat of the semi-spherical head ends. This is true in any event as long as the swinging motion does not exhibit too great a deflection so that a particularly reliable sealing of the semi-spherical head ends against the seats in case of smaller amplitude of the relative motion is assured and thus a good passage of the liquid.

Although the construction of a flow-through body in accordance with the invention in whole or in part of elastic material or of a bellows construction is conceivable in order in this way to obtain continuous axial pressure in the chamber, it is optimal in accordance with the invention, if the flow-through body has two cylinders which are displaceable telescopically one within the other with a close fit, each of the cylinders being provided at their one end with a semi-spherical head end which is provided with a bore hole which is narrower than the inside diameter of the inner space in the flow body, and for a compression spring to be provided within the cylinder and between the semi-spherical head ends.

By such a construction there is obtained a greater possibility of lengthening the flow-through body without its axial pressing force decreasing. In this connection it is readily possible to allow the two cylinders to slide on each other with such a close fit that the liquid cannot emerge even between them from the flow-through body without the telescopic free mobility of the cylinders with respect to each other being impeded. In this connection an additional improvement in the slideability of the two cylinders while retaining a good seal can be obtained by providing one or both of the cylinder surfaces which contact each other with annular grooves and ridges in the manner of a labyrinth packing.

The sealing of a flow-through body against its axial-end seat can be improved in particular by having the outside diameter of the inner cylinder greater than the diameter of the adjoining bore holes of the elements moving against each other. In this connection the pressure in the transported liquid exerts a resultant force on the two cylinders whereby they are pressed apart, i.e., therefore even with greater pressure of the semi-spherical head ends against the seat.

One special embodiment of the invention also consists in the fact that opposite the mouth of the bore hole through the second element a third element is movable along a second slide surface relative to the second element and that the means for the passage of the liquid is part of a lubricating system for this second slide surface.

In this way assurance is had from a lubricating standpoint that the lubricating liquid passes in the complete intended amount actually to the second slide surface. In this connection the invention of course is by no means limited to a combination of merely two or three elements which are movable with respect to each other, but, rather the lubricating system of the invention may also include a plurality of such elements while on the other hand several bore hole systems having the features of the invention can be inserted alongside of each other.

One special embodiment of the invention resides in a flattened region of a first shaft intended as third element being arranged swingable about a bolt between two connecting pieces arranged as second elements which are arranged with cylindrical outer surfaces perpendicular to the aforementioned direction of swing swingably within claw-like widenings, to be referred to as the first element, which widenings belong to the end of a second adjacent shaft.

One embodiment of the invention is described in further detail below with reference to the drawings in which FIG. 1 is a diagrammatic view partially in section of a joint of a universal power-transmission connection or the like having the features of the invention.

Figure 1:
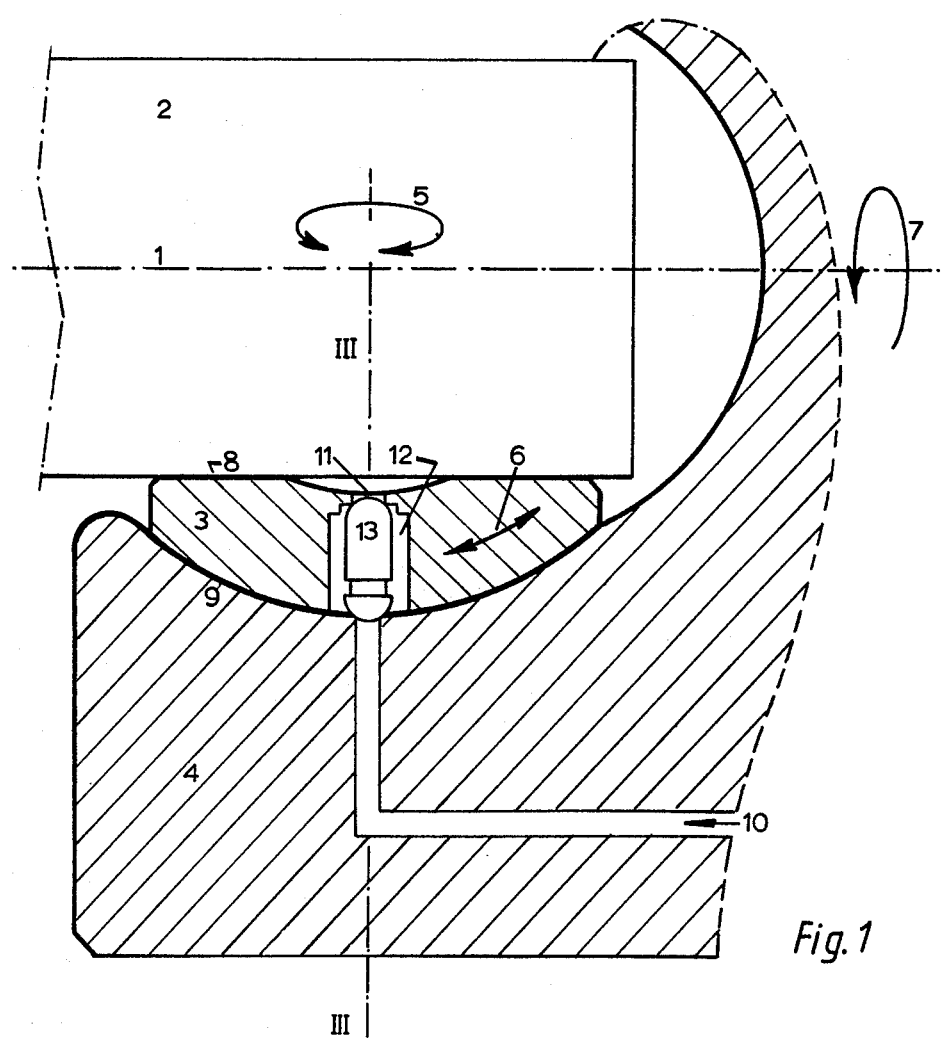

The one part of the universal joint connection visible in FIG. 1 of which the other part, not shown, is a mirror image, has a central longitudinal axis 1. The one shaft is provided at its one joint end with a flattened region 2 which is supported between two segments or connecting pieces 3 within an end 4 which is widened in claw-shape as seen in cross section of a second shaft which is connected with the first shaft. The arrows 5, 6 and 7 show the possibilities of movement of the flattened region 2 of the first shaft, namely (arrow 5) within the joint pieces 3, arrow 6 of the connecting pieces 3 within the end 4 and, finally (arrow 7), of the end 4 of the second shaft itself.

Figure 3:
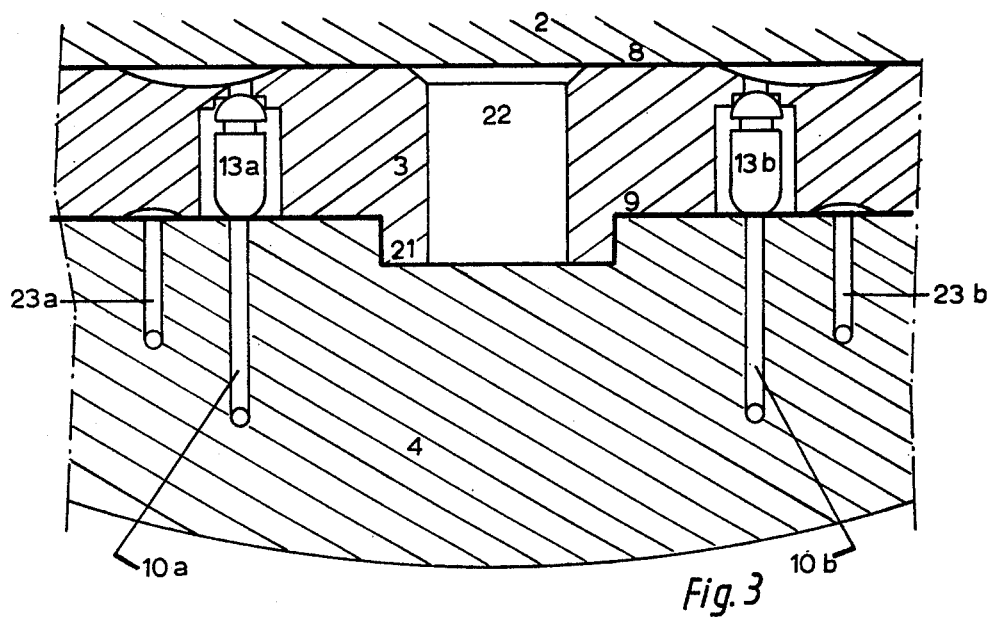
FIG. 3 is an enlarged partial sectional view along the line III—III of FIG. 1.
Figure 2:
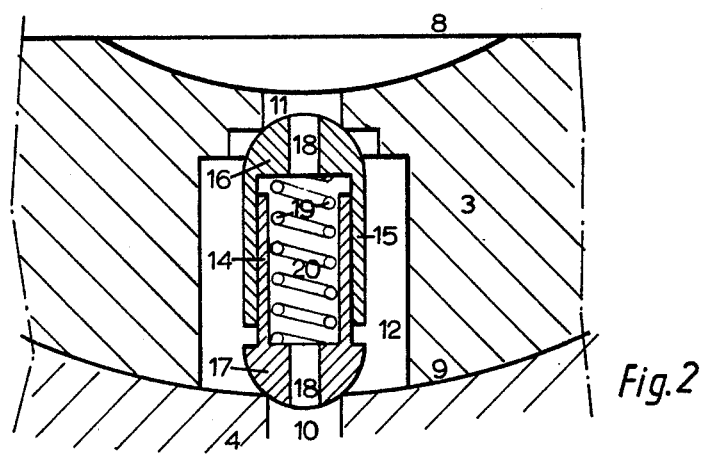
FIG. 2 shows on a larger scale, mainly in section, a portion of FIG. 1.

The slide surfaces 8 lying between the connecting pieces 3 and the flattened region 2 are provided with grease via the bore hole 10 while the grease passes through a bore hole 11 through the connecting pieces 3. The slide surfaces 9 present between the connecting pieces 3 and the claw-like inside of the end 4 of the second shaft are provided separately with grease through the bore holes 23a and 23b (FIG. 3). Each bore hole 11 is widened towards the slide surface 9 to form a chamber 12.

Within each chamber 12 there is arranged a flow-through body 13.

I claim:

1. A machine part, in which a limited swingable motion can be carried out along a slide surface between a first element and a second element, means being provided for conducting a liquid from a point of the first element which is distant from the slide surface to a side of the second element which faces away from the slide surface, said means having channels or bore holes through both elements with a connecting passage on the slide surface between them, the bore hole in at least one of the two elements being widened at the connecting passage to form an elongated chamber in which there is arranged a body through which fluid flows and provided in the axial direction with bore holes, and axially under pressure semi-spherical head ends on said body resting in sealing manner against two ends of the chamber.

2. The machine part according to claim 1, wherein said chamber is provided only in one of the two elements.

3. The machine part according to claim 1, wherein said chamber is provided in both elements.

4. The machine part according to claim 1, wherein said body through which fluid flows has two cylinders which are displaceable telescopically one within the other with a close fit to define an inner space, one end each of the cylinders being provided with a semi-spherical head end which has a bore hole which is narrower than the inside diameter of said inner space in the flow-through body, and a compression spring positioned within said inner space and between the two semi-spherical head ends.

5. The machine part according to claim 4, wherein the outside diameter of said inner space is greater than the diameter of the adjoining bore holes in the two elements.

6. The machine part according to claim 3, including on the side of the mouth of the bore hole through the second element a third element movable along a second slide surface relative to the second element, and that the means for the passage of the liquid is part of a lubricating system for said second slide surface.

7. The machine part according to claim 6, wherein several devices for the passage of a lubricant are provided in the first and second elements.

8. The machine part according to claim 6, wherein said third element in the form of a shaft has a flattened region arranged swingably around a bolt, between two connecting pieces which are arranged as second elements, and the cylindrical outer surfaces of which are arranged swingably perpendicular to the aforementioned direction of swing within claw-like widenings to be referred to as first element, which form part of the end of a second shaft.

9. The machine part according to claim 6 wherein each element contains several devices for the passage of a lubricant.

* * * * *

UNITED STATES PATENT AND TRADEMARK OFFICE
CERTIFICATE OF CORRECTION

PATENT NO. : 4,103,978
DATED : August 1, 1978
INVENTOR(S) : Simon HOORNSTRA

It is certified that error appears in the above-identified patent and that said Letters Patent are hereby corrected as shown below:

[30] Foreign Application Priority Data:

Change "Mar. 13, 1975" to -- Mar. 18, 1975 --.

Signed and Sealed this

Thirteenth Day of March 1979

[SEAL]

Attest:

RUTH C. MASON
Attesting Officer

DONALD W. BANNER
Commissioner of Patents and Trademarks